United States Patent

[11] 3,617,686

| [72] | Inventors | Walter Dietrich<br>645 Hanau Reichenberger Str., Hanau;<br>Dieter Fritz, 6461 Mittelgrundau<br>Wiesenweg 6, Mittelgrundau; Hans D.<br>Kluger, 6451 Bruchkobel, am Heinischen<br>Berg, Bruchkobel, all of Germany |
|---|---|---|
| [21] | Appl. No. | 842,244 |
| [22] | Filed | July 16, 1969 |
| [45] | Patented | Nov. 2, 1971 |
| [32] | Priority | July 26, 1968 |
| [33] | | Germany |
| [31] | | P 17 65 852.5 |

[54] APPARATUS FOR TREATING WORKPIECES WITH MAGNETICALLY FOCUSED BEAMS OF ELECTRICALLY CHARGED PARTICLES
7 Claims, 5 Drawing Figs.

[52] U.S. Cl.................................................219/121EB, 250/49.5
[51] Int. Cl.............................................................B23k 15/00
[50] Field of Search................................219/121, 121 EB, 121 L; 250/49.5

[56] References Cited
UNITED STATES PATENTS

| 3,082,316 | 3/1963 | Greene........................ | 219/117 |
| 3,426,174 | 2/1969 | Graham et al. ............... | 219/121 |
| 3,518,400 | 6/1970 | Gallivan ...................... | 219/121 |
| 3,131,289 | 4/1964 | Hansen....................... | 219/121 |
| 3,134,892 | 5/1964 | Opitz et al. .................. | 219/121 |

*Primary Examiner*—J. V. Truhe
*Assistant Examiner*—Robert E. O'Neill
*Attorney*—Joseph F. Padlon ABSTRACT: In an apparatus for the application of beams of charged particles to the treating of work and which includes an electron-optical lens for varying the energy density in the beam and an electromagnetic lens having an alternating potential component of fixed frequency superposed on its supply voltage so that the focal length of the lens varies as a function of the frequency, of means, particularly desirable for welding by electron beams, to make distribution of energy variable over the impingement section of the electron beam, that is, at the area of the treatment, whereby it becomes possible better to adapt to the properties of the material for achieving satisfactory welded connections.

APPARATUS FOR TREATING WORKPIECES WITH MAGNETICALLY FOCUSED BEAMS OF ELECTRICALLY CHARGED PARTICLES

The present invention relates to apparatus for treating workpieces with magnetically focused beams of electrically charged particles and has, for its main objective, improvements in the prior art as disclosed in German Pat. No. 937,108, (German-published application No. 1,118,375 and French Pat. No. 1,285,667), such improvements being desirable for various applications, particularly for welding by means of electronic beams as set forth in the above Abstract of Disclosure.

Another object of the invention is, in the accomplishment of the above first-named objective, to control the intensity distribution between the central region and the peripheral region in the cross section of the beam at the area of impingement of the charged particle beam on the workpiece by providing in the path of the beam, in addition to the magnetic lenses, at least one electrostatic lens in a manner known in itself, and by making the potential at this last-metioned lens periodically variable according to a curve of potential as a function of time which is determined according to the desired intensity distribution. Such an arrangement permits the achievement of a wide variety of distributions of intensity between the central region and the peripheral region in the cross section of the beam at the area of impingement by varying the shape of the sections having very high central intensity and broad, low radiation intensity in the peripheral region. For certain applications, adjustment is preferably made in a manner that the charged particle beam has a high peripheral intensity with little intensity in the central area at the point of impingement. The periodic potential change at the electrostatic lens is preferably produced in a known manner by means of an alternating potential generator which can produce various voltage forms such as sinusoidal, trapezoidal, sawtooth-shaped, pulse-shaped, etc. The effect of the periodic potential change may be interpreted as continuously varying the focus of the beam of charged particles relative to the surface of the workpiece. If the beam is to be adjusted for high central intensity and low peripheral intensity, the pulse shape of the potential variation is to be selected in such a manner that the pulse sections with focusing on the workpiece surface predominate over the pulse sections with defocusing. A rapid potential change of more than 600 Hz., for example of 5,000 Hz., is important because it makes a stable intensity distribution possible.

It has been found that a frequency of potential change above 600 Hz. may be advantageous in a known arrangement of the treating apparatus having magnetic and electrostatic focusing. It will be understood that this numerical value is intended for general orientation only, and that higher or lower frequencies may be useful in devices having special characteristics.

The electrostatic lens which is supplied with the variable potential may preferably be either a lens having rotational symmetry or it may consist of several pairs of plates which under certain circumstances are preferably supplied from different alternating potential generators having different curve shapes. This offers the possibility of controlling the beam profile in its cross section at impingement, otherwise than according to rotational symmetry, in such a manner that the intensity distribution between central regions and peripheral region is different in the working direction, that is, in the direction of movement of the workpiece relative to the beam of charged particles than at right angles to the working direction. Such an arrangement permits a further, most advantageous adaptation to the technological premises of the treating method and favors the achievement of a satisfactory treated region.

The accompanying drawings illustrating one embodiment of the invention and forming a part of the specification are as follows.

In the drawings like reference numerals indicate similar parts throughout the different views.

Figure 1:
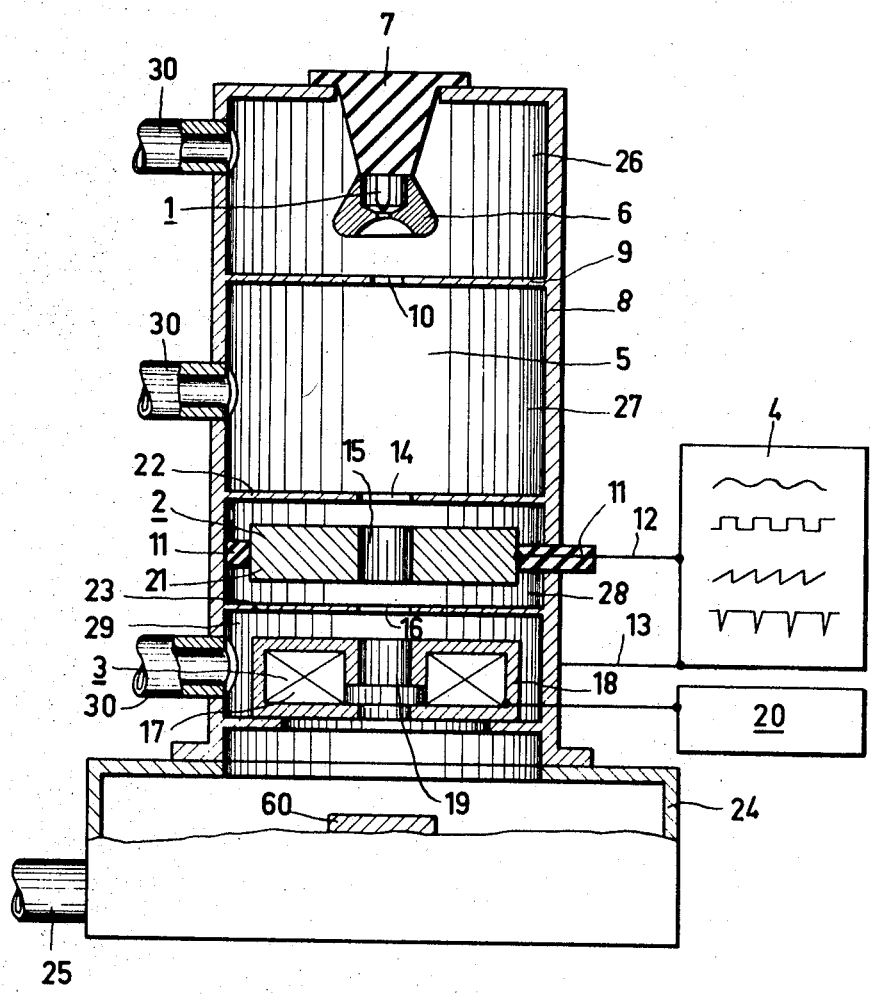
FIG. 1 is both a schematic illustration of the invention and a view of the apparatus shown partly in elevation and partly in longitudinal central section.

With reference first to FIG. 1:

The apparatus consists of a so-called electron beam column or gun 8, and an adjacent chamber for the workpiece. Labeled 1 is an electron beam source, consisting of an electrically heated filament, which is surrounded by a bias electrode 6. Bias electrode 6 and electron beam source 1 are connected to high negative voltage and mounted on an insulator 7, which dips into the vacuum-tight housing 8. Between electron beam source 1 forming the cathode and the grounded housing 8, there exists a potential difference, the so-called acceleration voltage for the electrons. The supply cables are not shown. On the same potential as the housing 8 is the acceleration anode 9 with an aperture 10 for the exit of the concentrated and slightly diverging electron beam 5 from compartment 26. An electrostatic lens 2 is mounted within the housing 8 and consists of an electrically conducting annular central part 21, supported by electrical insulators 11. Two electrically conducting annular diaphragms 22 and 23 are arranged above and under the central part 21. The diaphragms are electrically connected to the housing 8. The electrostatic lens 2 is supplied by the conductors 12 and 13 with a periodically alternating voltage produced by the alternating voltage generator 4. This generator may produce voltages of high frequency as represented by the diagrams shown within the frame of the diagrammatically drawn generator 4. The conductor 12 leads to the central part 21 and the conductor 13 to the housing 8 thus producing an alternating electrostatic field between the central part 21 and the diaphragms 22 and 23. The electrostatic field influences the electron beam 5 on its path through the apertures 14, 15 and 16, in respect to focusing and defocusing of the beam. In this manner a statistical distribution of power throughout to cross section of the beam is performed by highly frequent periodicity.

The main focusing of the beam 5 in the point of impact on the workpiece 60 is performed by the electromagnetic lens 3, consisting of a copper coil 17 within an iron capsule 18 with an inside slit for the exit of the magnetic field into the beam path. The electromagnetic lens also possesses a central aperture 19 for the passage of the beam 5 through the magnetic field zone and is supplied in a manner known to those skilled in the art by a controlled voltage generator 20. This generator produces a highly stabilized voltage which causes a stable position of the focus of the beam 5 on the workpiece 60.

The workpiece 60 is movably mounted in a chamber 24 which is vacuumtight connected to the housing 8. Chamber 24 is connected to a pumping device, not shown, by means of a vacuum pipe 25. A high vacuum is provided in chamber 24 and, by means of the apertures 10, 14, 15, 16 and 19, also in the electron gun respective to the housing 8. It is, however, possible to provide a higher pressure at near atmospheric pressure in the chamber 24. This requires a pressure stage system between the electron gun and chamber 24 and separate pumping systems for the pressure stages and the compartments 26, 27, 28 and 29 of the housing 8, as shown in U.S. Pat. No. 2,786,156 (Lorenz). It is often preferable to pump these compartments separately in any case, as shown by the pipes 30 in FIG. 1.

Figure 2:
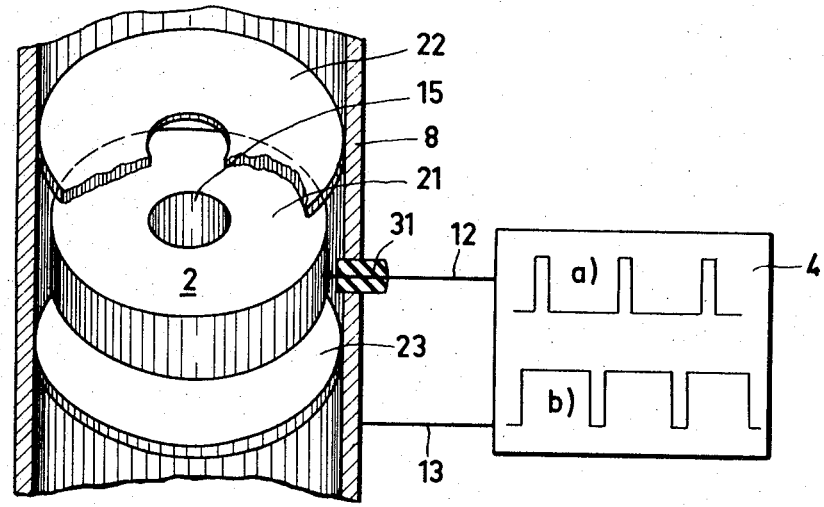
FIGS. 2, 3 and 4 and 5 are enlarged perspective views showing in diagrammatic illustration and, in elevation and longitudinal section, various parts of the apparatus as will be explained.

FIG. 2 represents a perspective view of the main parts of the invention, namely the electrostatic lens 2 comprising the central part 21 with central aperture 15, and the diaphragms 22 and 23, arranged within housing 8. The electrical conductor 12 is led into the housing via a vacuum-tight penetration plug 31. As shown, the central part 21 has rotational symmetric cross section in form of an annulus. Thus the electrostatic field produced by a voltage supply from generator 4 via conductors 12 and 13 will also have a rotational symmetric form. If the voltage supplied from generator 4 has a characteristic as for example represented by diagrams $a$ and $b$ in the generator symbol 4 the electrostatic field will be periodically altered and causes periodically focusing and defocusing in respect to the diameter of the beam normally focused by the electromagnetic lens 3. In case the relative focusing time is preponderant as shown by diagram $a$ in FIG. 2, it results a beam cross section with a high central power density and a lower edge power density, as shown in FIG. 3.

Figures 3, 4:
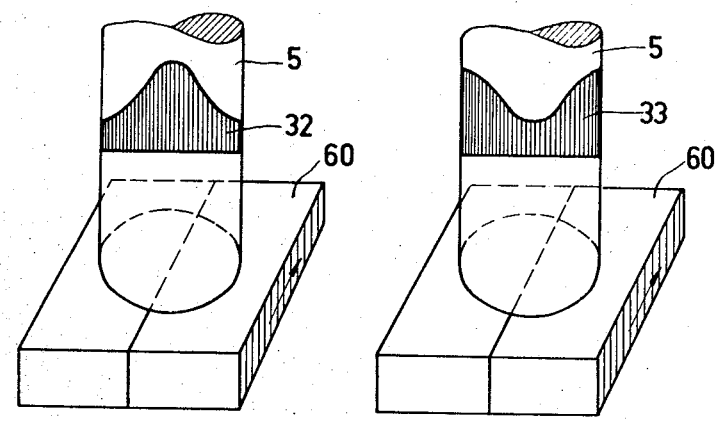

FIG. 3 represents a highly enlarged perspective view of a section of the workpiece 60 at the zone of impact of the beam 5. The beam has an essentially circular cross section, and the intensity distribution over this cross section is shown by the diagram 32, the vertical lines (hatching) representing the energy intensity in each point of impact of the beam. In fact, the diagram is three-dimensional, i.e., the power density distribution rotational symmetric.

FIG. 4 shows the power density distribution analogous to FIG. 3 in case the relative defocusing time is preponderant. This is achieved, for example, if the electrostatic lens 2 is supplied with an alternating voltage as represented by the diagram $b$ in FIG. 2. It results a beam 5 with a high-edge density and a lower central density, as shown by the diagram 33.

Figure 5:
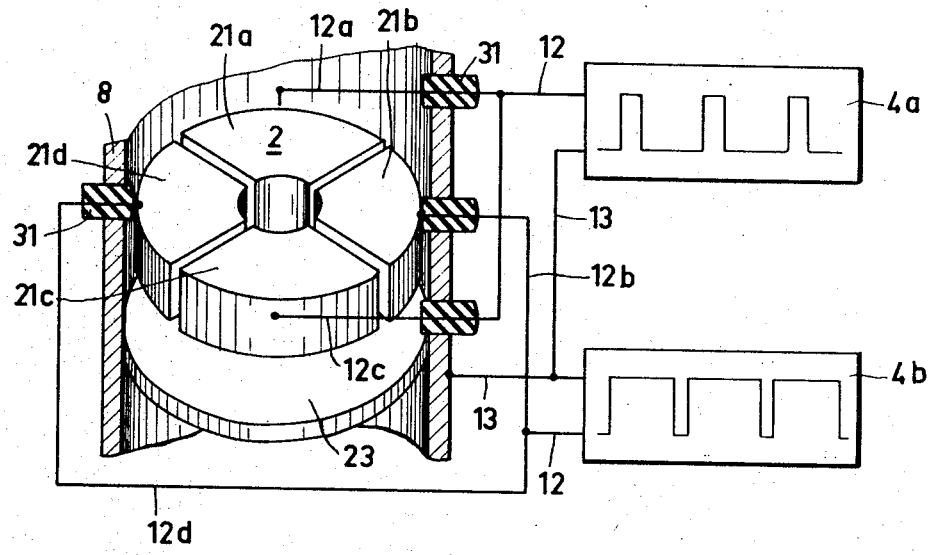

FIG. 5 represents a perspective view of the main parts of the apparatus analogous to FIG. 2 but with the essential difference that the central part 21 is divided into several sections 21$a$, 21$b$, 21$c$, and 21$d$, forming the arcs of a circle or annulus. For clearer visibility the annular diaphragm 22 has been omitted. The opposite sections 21$a$ and 21$c$ are supplied from the same generator 4$a$ by the conductors 12$a$ and 12$c$, the other opposite sections 21$b$ and 21$d$ are jointly supplied from another generator 4$b$ by the conductors 12$b$ and 12$d$.

The ground phases of the generators 4$a$ and 4$b$ are jointly connected to the housing 8 and hence to the diaphragm 23 via the conductor 13. In case both generators 4$a$ and 4$b$ are producing alternate voltages of different characteristics, as shown in FIG. 5, it results in a nonrotational symmetrical electrostatic field which leads to different power density distributions in the direction of the motion of the workpiece and in a direction vertical thereto. For example, if the motion of the workpiece is parallel to the axis through sections 21$a$ and 21$c$ and these sections are supplied by a voltage of such characteristics that the relative focusing time is preponderant (generator 4$a$), the power density profile of the beam in direction of the motion of the workpiece is, as shown in FIG. 3, diagram 32. If the other two sections 21$b$ and 21$c$ are supplied by a voltage of such characteristics that the relative defocusing time is preponderant (generator 4$b$), the power density profile of the beam in a vertical direction to the workpiece motion is as shown in FIG. 4, diagram 33.

What is now claimed is:

1. An arrangement for controlling the intensity of a beam of charged particles comprising, in combination, a source of charged particles; means for directing said particles in a beam along a predetermined stationary path; electrostatic lens means along said path of said beam of charged particles for shaping and modifying said beam, said beam being stationary in space; and electrical waveform generating means connected to said electrostatic lens means and applying a cyclically varying voltage to said electrostatic lens means for varying the intensity distribution of said stationary beam at a predetermined cross-sectional area of said beam.

2. The arrangement as defined in claim 1 wherein said intensity distribution comprises the energy distribution of said beam between the center of said beam and the peripheral portion of said beam.

3. The arrangement as defined in claim 1 wherein the frequency of said cyclically varying voltage is at least 600 cycles per second.

4. The arrangement as defined in claim 1 wherein said electrostatic lens means is symmetrical about the central axis of said beam.

5. The arrangement as defined in claim 1 including electromagnetic lens means along said path of said beam of charged particles for further shaping said beam.

6. The arrangement as defined in claim 1 wherein said electrostatic lens means comprises a plurality of pairs of plates electrically isolated; and means for applying different voltages to said pairs of plates.

7. The arrangement as defined in claim 1 wherein said electrostatic lens means comprises a disc-shaped member.

* * * * *